(12) United States Patent
Tzannes et al.

(10) Patent No.: US 8,483,497 B2
(45) Date of Patent: *Jul. 9, 2013

(54) IMAGE QUALITY CONTROL TECHNIQUES

(75) Inventors: Alexis Paul Tzannes, Lexington, MA (US); Ron Abraham Gut, Belmont, MA (US)

(73) Assignee: AWARE, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,707

(22) Filed: Apr. 4, 2012

(65) Prior Publication Data

US 2012/0224776 A1    Sep. 6, 2012

Related U.S. Application Data (63) Continuation of application No. 10/558,693, filed as application No. PCT/US2004/018216 on Jun. 4, 2004, now Pat. No. 8,204,323.

(60) Provisional application No. 60/476,100, filed on Jun. 5, 2003.

(51) Int. Cl.
*G06K 9/36* (2006.01)
*G06K 9/46* (2006.01)

(52) U.S. Cl.
USPC .......................................... 382/239; 382/240

(58) Field of Classification Search
None
See application file for complete search history.

(56) References Cited

U.S. PATENT DOCUMENTS

| 5,301,242 A | 4/1994 | Gonzales et al. |
|---|---|---|
| 5,414,527 A | 5/1995 | Koshi et al. |
| 5,691,770 A | 11/1997 | Keesman et al. |
| 5,832,129 A | 11/1998 | Horiuchi et al. |
| 5,859,788 A | 1/1999 | Hou |
| 5,881,176 A | 3/1999 | Keith et al. |
| 6,075,884 A | 6/2000 | Lubin et al. |
| 6,219,383 B1 | 4/2001 | Park |
| 6,263,020 B1 | 7/2001 | Gardos et al. |
| 6,263,312 B1 | 7/2001 | Kolesnik et al. |
| 6,307,971 B1 | 10/2001 | Persiantsev et al. |
| 6,330,369 B1 | 12/2001 | Cornog et al. |

(Continued)

FOREIGN PATENT DOCUMENTS

| WO | WO 97/16029 | 5/1997 |
|---|---|---|
| WO | WO 01/54417 | 7/2001 |

OTHER PUBLICATIONS

Kasner, James H.; Marcellin, MichaelW W.; Hunt, Bobbgr R. "Universal trellis coded quantization", IEEE Transactions on Image Processing, 1999.*

(Continued)

*Primary Examiner* — Li Liu
(74) *Attorney, Agent, or Firm* — Jason H. Vick; Sheridan Ross, PC (57) ABSTRACT

A technique for controlling the quality of one or more compressed images. The technique allows, for example, the selection of a target quality metric(s) and the compression of the image(s) such the compressed image(s) meets the metric(s). Alternatively, a target quality metric can be specified, and the image(s) compressed using parameters estimated to achieve the target quality. Optionally, the quality metric can also be made available to, for example, a user on an image processing system. The quality metrics can be, for example, for one or more layers, one or more images and/or one or more image sequences.

16 Claims, 6 Drawing Sheets

U.S. PATENT DOCUMENTS

| | | | |
|---|---|---|---|
| 6,504,494 B1 | 1/2003 | Dyas et al. | |
| 6,529,631 B1 | 3/2003 | Peterson et al. | |
| 6,553,141 B1 | 4/2003 | Huffman | |
| 6,668,090 B1 | 12/2003 | Joshi et al. | |
| 6,895,121 B2 | 5/2005 | Joshi et al. | |
| 7,003,167 B2 | 2/2006 | Mukherjee | |
| 2002/0061066 A1 | 5/2002 | Persiantsev et al. | |
| 2003/0063810 A1 | 4/2003 | Chebil | |
| 2003/0113027 A1 | 6/2003 | Chan et al. | |
| 2003/0123742 A1 | 7/2003 | Zhao et al. | |
| 2003/0161542 A1 | 8/2003 | Ridge | |
| 2004/0047511 A1* | 3/2004 | Tzannes et al. | 382/232 |
| 2004/0146205 A1 | 7/2004 | Becker et al. | |
| 2004/0228537 A1* | 11/2004 | Yeung et al. | 382/239 |
| 2007/0019873 A1 | 1/2007 | Tzannes et al. | |

OTHER PUBLICATIONS

Boliek, Martin (editor), JPEG 2000 Part 1 FDIS With Corrigendum 1 and Draft Corrigendum 2, Jul. 5, 2001.

ISO/IEC 14495-1, JPEG2000 Image Coding Standard, Part 1, 2000.

Hontsch et al. "Adaptive Image Coding With Perceptual Distortion Control," IEE Transactions on Image Processing, Mar. 2002, vol. 11, No. 3, 213-222.

International Search Report for International (PCT) Application No. PCT/US04/18216, mailed Oct. 13, 2004.

Written Opinion for International (PCT) Application No. PCT/US04/18216, mailed October. 13, 2004.

International Report on Patentability for International (PCT) Application No. PCT/US04/18216, mailed Dec. 22, 2005.

Official Action for U.S. Appl. No. 10/558,693, notification date Apr. 14, 2009.

Official Action for U.S. Appl. No. 10/558,693, notification date Dec. 16, 2009.

Official Action for U.S Appl. No. 10/558,693, mailed May 26, 2010.

Official Action for U.S. Appl. No. 10/558,693, mailed Jan. 11, 2011.

Official Action for U.S. Appl. No. 10/558,693, mailed Aug. 25, 2011.

Notice of Allowance for U.S. Appl. No. 10/558,693, mailed Mar. 19, 2012.

Chen, Jiann-Jone et al. "Optimal Bit Allocation for Coding of Video Signals Over ATM Networks" IEEE Journal on Selected Areas in Communications, vol. 15, No. 6, Aug. 1997.

Daugman, John G. "Complete Discrete 2-D Gabor Transforms by Neural Networks for Image Analysis and Compression" Jul. 1988, IEEE Transactions on Acoustics, Speech and Signal Processing. vol. 36, No. 7, pp. 1169-1179.

Fukuhara, Takahiro et al. "Motion JPEG2000 Final Draft International Standard 1.0"—ISO/IEC/JTC 1/SC 29/WG1 N2250; Apr. 30, 2003.

He et al., "Low Power Estimation Design Using Adaptive Pixel Truncation" 1997, ACM Press, pp. 167-172.

Taubman, David S. et al. "JPEG2000 Image Compression Fundamentals, Standards and Practice"—whole book.; Kluwer Academic Publishers, 2002; ISBN 0-7923-7519-x.

Tescher, Andrew G. "Applications of Digital Image Processing XXV" The International Society for Optical Engineering, XP-002258915, Sep. 25, 2003.

Tzannes, A.P., et al. "JPEG2000 Applications and Products—Applications of Digital Image Processing XXV" Schedule of Conference 4790, Seattle, WA, Jul. 8-10, 2002, XP002258222, p. 2, Session 4.

Tzannes, Alexis P. "An Iterative Rate Control Technique for Motion JPEG2000" Applications of Digital Image Processing XXV, Seattle, WA, USA, Jul. 8-10, 2002, vol. 4790.

International Search Report for International Application No. PCT/US2003/020899, mailed Feb, 12, 2003.

Official Action for U.S. Appl. No. 10/611,950, mailed Mar. 28, 2007.

Official Action for U.S. Appl. No. 10/611,950, mailed Aug. 14, 2007.

Official Action for U.S. Appl. No. 10/611,950, mailed Feb. 4, 2008.

Official Action for U.S. Appl. No. 10/611,950, mailed Apr. 3, 2008.

Official Action for U.S. Appl. No. 10/611,950, mailed Dec. 15, 2008.

Official Action for U.S. Appl. No. 10/611,950, mailed Oct. 7, 2009.

Official Action for U.S. Appl. No. 10/611,950, mailed Jun. 23, 2010.

Official Action for U.S. Appl. No. 10/611,950, mailed Jan. 13, 2011.

* cited by examiner

IMAGE QUALITY CONTROL TECHNIQUES

RELATED APPLICATION DATA

This application is a continuation of U.S. application Ser. No. 10/558,693, filed Nov. 30, 2005 now U.S. Pat. No. 8,204,323, which is a national stage application under 35 U.S.C. §371 of PCT Application No. PCT/US2004/018216, having an international filing date of Jun. 4, 2004, which designated the United States, which PCT application claims the benefit of and priority under 35 U.S.C. §119(e) to U.S. Patent Application No. 60/476,100, filed Jun. 5, 2003, entitled "Image Quality Control Techniques for JPEG2000," each of which are incorporated herein by reference in their entirety.

BACKGROUND OF THE INVENTION

1. Field of the Invention

This invention relates to images. In particular, an exemplary aspect of this invention relates to quality control for image compression.

2. Description of Related Art

With the dependence on multimedia technologies becoming greater exponentially, image compression techniques need to correspondingly increase in performance. The JPEG2000 standard is intended to provide rate distortion and subjective image quality performance superior to existing standards, and to also provide features and functionalities that current standards address only partially or do not address at all. The JPEG2000 standard is designed to address requirements of a diversity of applications, for example, images, internet multimedia, color facsimile, printing, color printing, scanning, digital photography, remote sensing, mobile applications, medical imagery, digital libraries, and e-commerce, just to name a few.

The JPEG2000 standard is the new image compression standard created by ISO/IEC JTC1 SC29 Working Group 1, also known as the Joint Photographic Experts Group (JPEG). Part 1 of the JPEG2000 standard, which is incorporated herein by reference in its entirety, addresses the compression of still images.

As is common with the majority of compression standards, Part 1 of the JPEG2000 standard is a decoder standard. The standard addresses the syntax of the compressed code stream and the required behavior of the decoder, i.e., exactly how the decoder is to decode a compliant coded stream. Although the encoding process is implicitly dictated by the standard, not all encoding details are specified by the standard. In fact, there are several decisions and options that are left up to the encoder. A simple example is the number of wavelet transform levels, which is strictly an encoder determined option. Specifically, the number of transform levels is not dictated by the standard, only a range of allowable values, i.e., from 0 to 32, is provided.

SUMMARY OF THE INVENTION

Another important decision an encoder must make is that of rate allocation or rate control. The encoder must determine how to choose quantization binwidths and determine if and how to truncate the encoded bitstream. The decisions made can impact both the compressed image size and the resulting image quality of the compressed image.

JPEG2000 image compression allows both lossless and lossy compression of images. Lossless compression stipulates that, after decompression, an image identical to the original image is produced. Lossy compression on the other hand, indicates that, after decompression, an image which is a representation, but not identical to, the original image is produced.

During lossy compression, distortion or data loss is introduced in the steps of the compression process. The sources of this distortion include, for example, implementation precision, quantization distortion, codestream truncation, and the like.

Specifically, implementation precision introduces distortion during image processing and operations. This distortion is associated with the fact that the required arithmetic operations are not performed with infinite precision. Since some of the operands are irrational numbers they are necessarily approximated. The precision of these approximations, e.g., 32 bit or 16 bit, can directly affect the quality of the resulting image.

A second way that distortion is introduced is via quantization. Quantization is the process of mapping the calculated wavelet coefficients, which are the result of applying the wavelet transform to the original image, to a set of integer indices. The set of unique integer indices is smaller than the set of unique input wavelet coefficients. During the dequantization process, each integer index is mapped to a representative wavelet coefficient value. This introduces distortion since the representative value is an approximation of the original wavelet coefficient. After quantization, the quantized wavelet coefficients are encoded into codestreams.

A third way distortion is introduced is the truncation of these encoded codestreams. The decisions on how to truncate might be based on desired compressed image size or desired compressed image quality.

Accordingly, exemplary embodiments of the invention provide a technique for controlling the quality of one or more compressed images. The technique allows, for example, the selection of a target quality metric(s) and the compression of the image(s) such the compressed image(s) meets the metric (s).

It should be appreciated that the techniques disclosed herein can be expanded to any type or format of image, image sequence or motion video. Additionally, the techniques disclosed herein can be applied to the compression of time-series data, such as video sequences, as well as other 3-dimensional data sets, such as medical data, such as, for example, CAT or MRI scans, which are 2-dimensional slices cut along a volume, and hyperspectral data, which are 2-dimensional images differing by the acquisition spectral band, i.e., their color.

Additionally, the exemplary systems and methods discussed herein provide a technique for quality control for compressing a video sequence using Motion JPEG2000. The quality control techniques can be used for one or more images in the sequence. In addition, the technique can be used for controlling the quality of the entire sequence as a whole. Accordingly, the exemplary systems and methods of this invention at least provide a technique for controlling one or more image quality compression parameters for a series of images and/or an image sequence.

Aspects of the invention relate to image quality control techniques.

Aspects of the invention also relate to estimating the quality of a compressed image during compression.

Additional aspects of the invention relate to controlling the quality of a compressed image by estimating and/or measuring the distortion during compression.

Aspects of the invention further relate to determining quantization distortion.

Aspects of the invention are also directed toward determining the amount of distortion introduced by selecting certain truncation points during the compression process.

Further aspects of the invention relate to determining compression characteristics predicted to meet an image and/or image layer quality metric.

Additional aspects of the invention relate to analyzing one or more image characteristics and obtaining binwidths likely to meet one or more image or image layer quality metrics.

Aspects of the invention also relate to adjusting one or more of quantization tables and truncation points to ensure a compressed image(s) meets a quality metric(s).

Aspects of the invention further relate to selecting truncation points such that one or more quality metrics are met.

These and other features and advantages of this invention are described in, or are apparent from, the following detailed description of the embodiments.

BRIEF DESCRIPTION OF THE DRAWINGS

The embodiments of this invention will be described in detail, with reference to the following figures, wherein.

DETAILED DESCRIPTION

The exemplary systems and methods of this invention will be described in relation to image encoding and image decoding. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should however be appreciated that the present invention may be practiced in a variety of ways beyond the specific details set forth herein.

Furthermore, while the exemplary embodiment illustrated herein show the various components of the system collocated, it is to be appreciated that the various components of this system can be located at distant portions of a distributed network, such as a LAN and/or the internet, or within a dedicated image processing system. Thus, it should be appreciated that the components of the image processing system can be combined into one or more devices or collocated on a particular node of a distributed network, such as a communications network. It will be appreciated from the following description, and for reasons of computational efficiency, that the components of the image processing system can be arranged at any location within a distributed network without affecting the operation of the system.

Furthermore, it should be appreciated that the various links connecting the elements can be wired or wireless links, or any combination thereof, or any other known or later developed element(s) that is capable of supplying and/or communicating data to and from the connected elements. Additionally, the term module as used herein can refer to any known or later developed hardware, software, or combination of hardware and software that is capable of performing the functionality associated with that element.

An image compression algorithm typically comprises a transform operation, optionally followed by a quantization operation, followed by a coding operation. Distortion may be introduced during all three of these operations. Wavelet transforms are popular choices for the transform operation due to their energy compacting properties.

Consider an image that has been decomposed into N subbands using a 2-dimensional wavelet transform. Each subband can be represented as $S_i$, i=1, . . . , N. Quantizing each subband $S_i$ to a rate $R_i$ results in some amount of distortion on the final reconstructed image. This distortion can be denoted as $D_i(R_i)$. Assuming that the distortion measure is additive across all subbands, the total distortion on the final image will be:

$$D_{total} = \sum_{i=1}^{N} n_i N_i D_i(R_i)$$

where $n_i$ is the fraction of coefficients in subband i, and $N_i$ is a normalization factor that accounts for the wavelet transform synthesis gain.

In JPEG2000, the distortion is a combination of the three types of distortions. The three types are arithmetic precision, quantization distortion, and codestream truncation, as described above. For example, in JPEG2000 when using the 9-7 wavelet filter, quantization and truncation introduce distortions, while for the 5-3 wavelet filter, codestream truncation introduces distortions.

Figure 1:
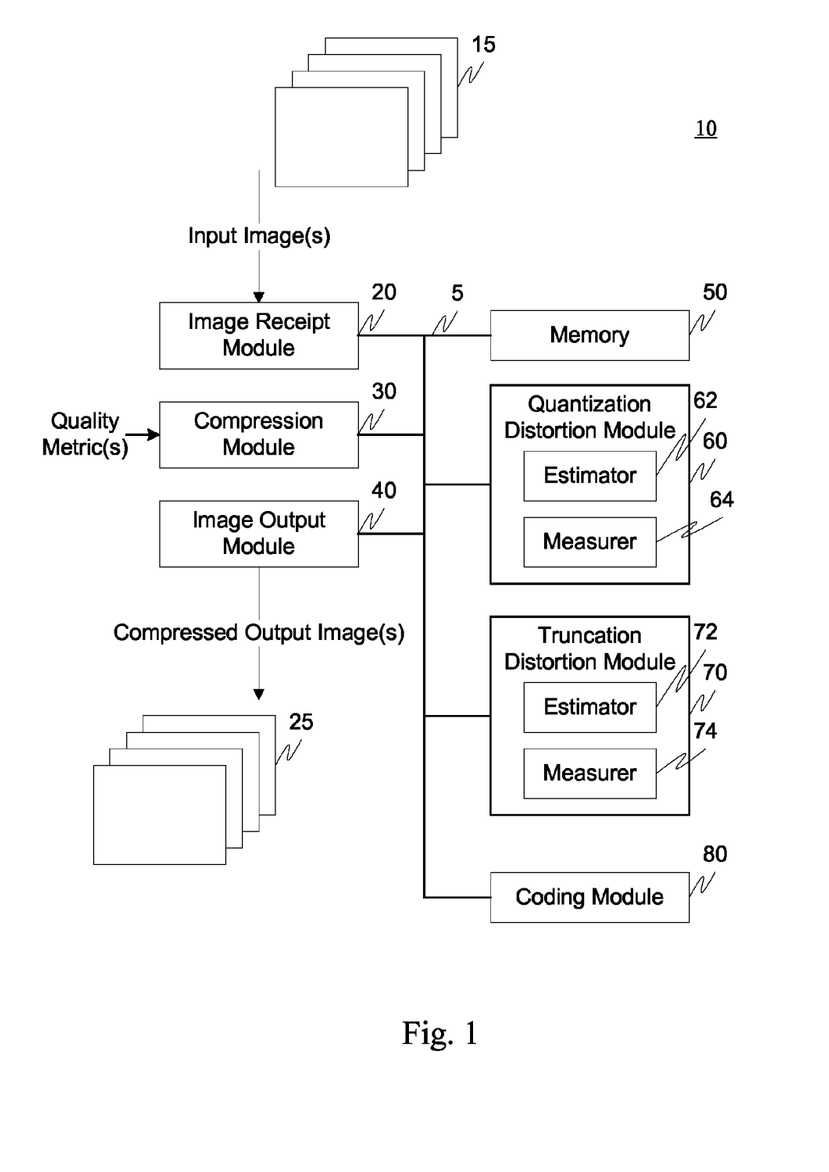
FIG. 1 illustrates an exemplary compression system according to this invention.

FIG. 1 illustrates an exemplary embodiment of an image quality control system 10 according to this invention. In particular, the image quality control system 10 comprises an image receipt module 20, a compression module 30, an image output module 40, a memory 50, a coding module 80 and a distortion determination system having a quantization distortion module 60 and a truncation distortion module 70, all interconnected by link 5. The quantization distortion module 60 further comprises an estimator 62 and a measurer 64. The truncation distortion module 70 further comprises an estimator 72 and a measurer 74.

In accordance with a first exemplary operational embodiment, one or more input images 15 are received by the image receipt module 20. The image receipt module 20, in cooperation with one or more of the compression module 30 and memory 50 commences compression of the one or more input images 15. During the compression operation, and in cooperation with the coding module 80, a wavelet transform is performed on the one or more input images 15. If quantization is used, the coding module 80 quantizes the wavelet coefficients and the quantization distortion module 60 one or more of measures and estimates the quantization distortion. For example, the estimates can be based on a modeling routine and the measuring can be a comparison with the original image. Illustratively, the estimates can be based on statistical and/or empirical modeling of the image or wavelet transform data. The distortion can be measured directly by comparison of the original image data to the reconstructed image data or by comparison of the original wavelet transform data to the dequantized wavelet transform data.

The coding module 80 then commences wavelet coefficient coding and, in a similar manner, if truncation is used, cooperates with the truncation distortion module 70, and in particular the estimator 72 and measurer 74, to one or more of estimate and measure, respectively, the distortion caused by the selected truncation points. For example, the estimator 72 and measurer 74 can one or more of estimate and measure, respectively, the quality of the one or more compressed input images 15 and/or one or more layers within the input images 15. The estimates can be based on statistical and/or empirical modeling of the image and/or wavelet transform data. The distortion can be measured directly by comparison of the original image data to the reconstructed image data or by comparison of the original wavelet transform data to the decoded and dequantized wavelet transform data.

The estimated quality of the compressed input image(s) can then be compared to a target quality metric. This target quality metric can, for example, be based on one or more of objective image quality metrics such as, for example, the peak signal to noise ratio (pSNR), mean squared error (MSE), or the like, or subjective metrics, such as, for example, based on human visual system models, operator inspection, psychophysical characteristics, or the like.

A processor (not shown) can make the comparison between the target quality metric(s) and the quality of the compressed image(s). If the target quality metric has been met, and in cooperation with the image output module 40, the compressed output image(s) can be output. Optionally, and in cooperation with the processor, the quality metric can be made available to, for example, a user, for example, on an image display device (not shown) associated with the image quality control system. Furthermore, and optionally in conjunction with the displaying of the quality metric, one or more of the original image, iterative versions of the image and the compressed image 25 can be displayed, for example, in a side-by-side manner for easy comparison.

However, if the compressed image(s) does not meet the quality metric(s), one or more of the quantization tables and truncation points within the coding module 80 can be adjusted. If one or more of the quantization tables and truncation points are adjusted, the coding module 80 is updated and one or more of quantization and truncation are again performed including measuring and/or estimating the quantization and truncation point distortion and subsequent comparison to a target quality metric. This process can continue until, for example, a specific target quality metric(s), if one has been specified, is met.

More specifically, and in accordance with an exemplary embodiment that relates directly to the 9-7 or 5-3 wavelet transform specified in the JPEG2000 Standard, the following steps are performed during the compression operation. In particular, when the 5-3 wavelet filter is used while coding the wavelet coefficients, the truncation distortion module 70 estimates and/or measures the total distortion ($D_{total}$) introduced if no data is included in the bitstream. Then, during truncation of the bitstream, an estimate or measurement of the distortion reduction corresponding to each codeblock of data included in the bitstream is performed. This total distortion reduction for all code blocks is subtracted from the total distortion figure ($D_{total}$) to total, achieve an estimate of the resulting quality of the compressed image.

As discussed above, if the compressed image or sequence of images must meet a specific quality target metric, the truncation points can be changed and truncation again performed. This process can continue until the quality metric(s) is met. This comparison can be performed for one or more layers within one or more images, a single image, or over a plurality of images. Additionally, this system can be dynamic and use quality metrics stored in, for example, a look-up table, that correspond to the type of image data received. For example, there may be one or more specific image quality metrics for medical data, for web images, for publishing, or the like. Thus, it would not be necessary for a user to select a specific quality metric, but rather only need identify the type of input image(s). For example, a user can be provided with a graphical user interface (not shown), which can include various selectable portions that allow a user to easily specify the type of input image. For example, the graphical user interface could include selectable portions that would allow the user to specify, for example, on a scale of 1 to 10, the desired quality of a compressed image. The image quality control system 10 can then take this specified quality target into consideration when performing compression on the one or more input images 15, as discussed in more detail below.

If the coding module 80 uses the 9-7 wavelet filter in a JPEG2000 environment, the quantization distortion module 60 estimates and/or measures the distortion introduced during quantization. Then, while coding the quantized wavelet coefficients, an estimate or measurement of the total distortion ($D_{total}$) introduced if no data is included and the bitstream is performed. This distortion is then added to the distortion that was estimated or measured during quantization. Then, as with the 5-3 wavelet filter, during truncation of the bitstream an estimate or measurement of the distortion reduction corresponding the codeblock of data included in the bit stream is performed and the total distortion reduction for all codeblocks is subtracted from ($D_{total}$), thereby providing an estimate of the resulting quality of the compressed image. As with the 5-3 wavelet filter technique, if the compressed image or sequence of images must meet a specific quality target, the results can be used to alter one or more of the quantization tables and/or truncation points to recompress the image.

A second exemplary embodiment for image quality control utilizes a target quality metric(s), for one or more of one or more layers within an image(s), an image and/or a sequence of images, which is specified prior to quantization and truncation. In particular, upon receipt of an input image(s) 15, the compression module 30 commences compression. Then, during the compression operation, and in cooperation with the coding module 80, a wavelet transform is performed on the one or more input images 15. One or more target quality metrics are then received by the compression module 30. For example, as previously discussed, the quality metrics can be directly input by, for example, a user, or, for example, based on the one or more received image types. The quality metric(s) can be, for example, a target compression rate, a target file size, a target quality and/or a layer target quality.

If quantization is used, and given an image(s) with certain characteristics, the binwidths likely to meet the received target quality metric(s) are determined Quantization is performed and, in cooperation with the quantization distortion module 60, a measurement and/or estimate of the quantization distortion is obtained.

If quantization is not used, wavelet coefficient coding commences in cooperation with the coding module 80. A determination is then made whether truncation is used. If truncation is used, and in cooperation with the truncation distortion module 70, and in particular with the estimator 72 and measurer 74, one or more of an estimate or measurement of the distortion for all codeblocks due to the truncation is determined The truncation points that meet the one or more quality metrics are then selected. Once the quality metrics have been met, bitstream truncation commences and the compressed image is output.

For the quantization distortion estimation, a common technique for estimating the distortion is to assume a statistical model for the quantized wavelet coefficients. Quantization binwidths are selected based on this statistical assumption.

In accordance with an exemplary embodiment, it is assumed that the quantized wavelet coefficients can be modeled using a Laplacian density. Under this assumption, the distortion values can be approximated from simple statistics of each subband, such as the variance. However, it should be appreciated that while Laplacian modeling is utilized in this exemplary embodiment, in general Generalized Gaussian or any other statistical or empirical model could be also be used.

Similarly, for the truncation distortion estimation, an exemplary technique for estimating the distortion due to truncation is to assume a statistical model for the quantized wavelet coefficients. The contribution to the distortion due to the exclusion of each encoded bit is estimated. The total distortion introduced by truncation is the sum of the estimates of the distortions of each bit that is excluded due to this truncation. However, it should be appreciated that while statistical modeling is utilized in this exemplary embodiment, in general any other statistical or empirical model could be also be used.

Figure 2:
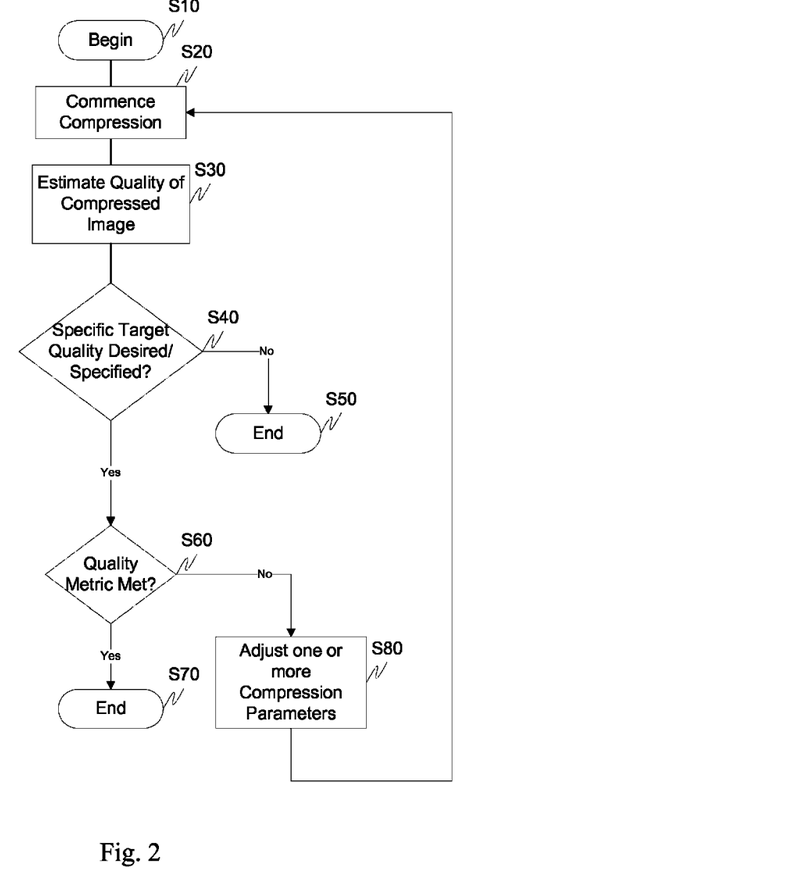
FIG. 2 is a flowchart illustrating an exemplary compression method according to this invention.

FIG. 2 outlines an exemplary image quality control method. In particular, control begins in step S10 and continues to step S20. In step S20, compression commences. Next, in step S30, the quality of the compressed image is estimated. Then, in step S40, a determination is made whether a specific target quality is desired or has been specified. If a target quality has not been specified, or is not desired, control continues to step S50 where the control sequence ends. Optionally, the quality metric can be made available, for example, to a user on an image processing system. Otherwise, control jumps to step S60.

In step S60, a determination is made whether one or more of: one or more image layers, one or more images, a sequence of images and/or one or more sequences of images have met the specific quality target specified by one or more image quality metrics. As discussed, these quality metrics can relate to, for example, one or more of pSNR, MSE, a target compression rate, a target file size, a target quality, layer(s) target quality, or the like.

If the one or more quality metrics have been met, control jumps to step S70 where the control sequence ends. Optionally, as discussed above, the quality metric can be made available to, for example, a user or other entity to allow, for example, an indication as to the success of the compression. Otherwise, control continues to step S80.

In step S80, one or more compression parameters are adjusted and control jumps back to step S20.

Figure 3:
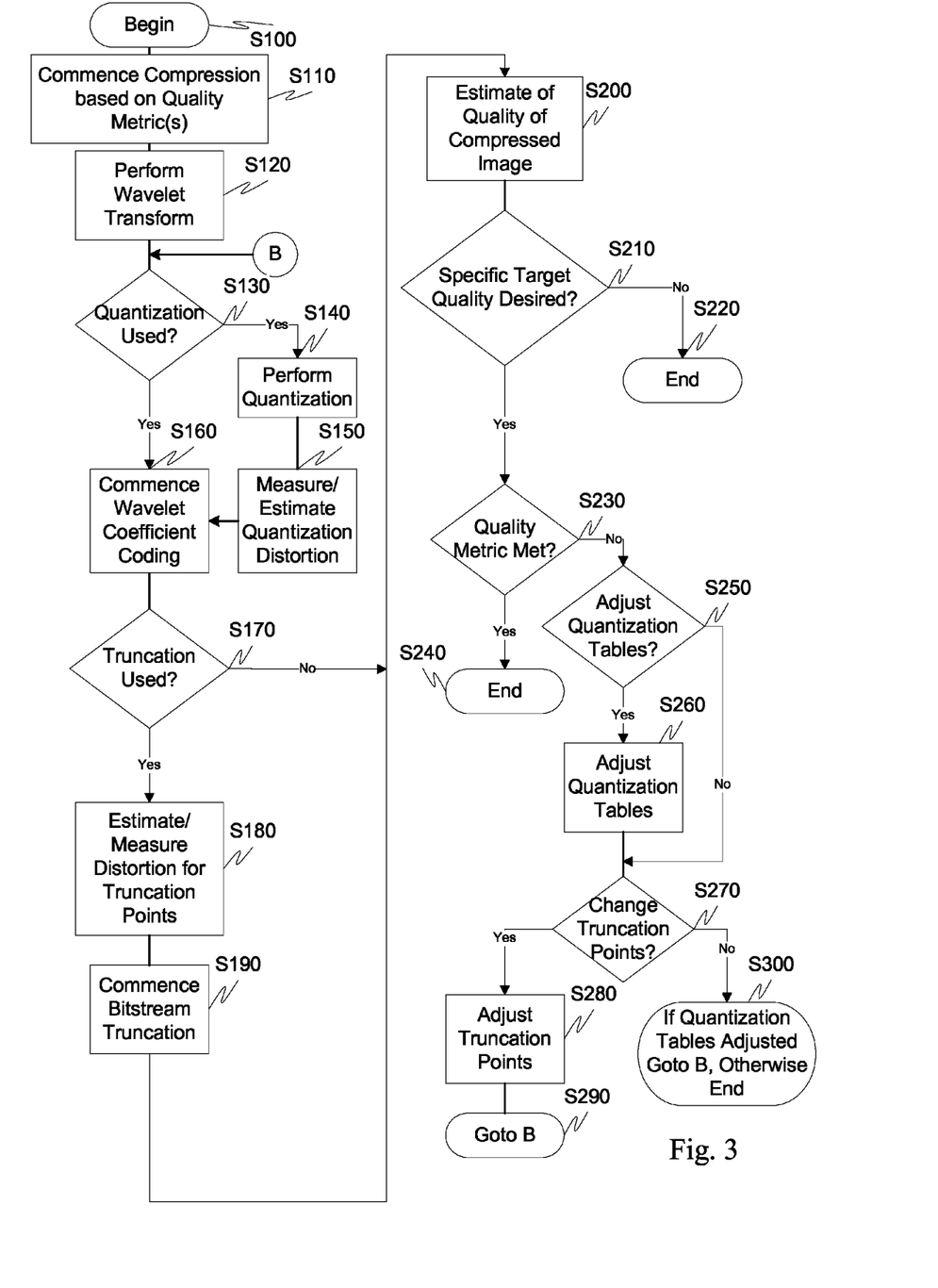
FIG. 3 is a flowchart illustrating a second exemplary compression method according to this invention.

FIG. 3 outlines a second exemplary method of operation for image quality control. In particular, control begins in step S100 and continues to step S110. In step S110, compression of one or more received images based on a quality metric(s) begins. Next, in step S120, the wavelet transform is performed. Then, in step S130, a determination is made whether quantization is to be used. If quantization is to be used, control continues as step S140. Otherwise, control jumps to step S160.

In step S140, quantization is performed. Then, in step S150, a measurement and/or estimate of the quantization distortion is determined For example, the estimate can be based on, for example, statistical and/or empirical modeling of the image or wavelet transform data. The distortion can be measured directly by comparison of the original image data to the reconstructed image data or by comparison of the original wavelet transform data to the dequantized wavelet transform data. Control then continues to step S160.

In step S160, wavelet coefficient coding is commenced. Next, in step S170, a determination is made whether truncation is used. If truncation is not used, control jumps to step S200. Otherwise, control continues to step S180.

In step S180, an estimate and/or measurement of the distortion from the truncation points is performed. Then, in step S190, bitstream truncation commences. As with the measurement and/or estimate of the quantization distortion, the estimate and/or measurement of the distortion for truncation points can be based on one or more of a modeling technique and/or comparison to the original image. Control then continues to step S200.

In step S200, an estimate of the quality of the compressed image is determined Next, in step S210, a determination is made whether a specific target quality is desired. If a specific target quality is not desired, control continues to step S220 where the control sequence ends. Otherwise, control continues to step S230 where a determination is made whether one or more quality metrics have been met.

If one or more quality metrics have been met, control continues to step S240 where the control sequence ends. Otherwise, control jumps to step S250 where a determination is made whether to adjust the quantization tables. If the quantization tables are to be adjusted, control continues to step S260 where the quantization tables are adjusted. Otherwise, control jumps to step S270.

In step S270, a determination is made whether to change the truncation points. If the truncation points are to be changed, control continues to step S280 where the truncation points are adjusted. Control then continues to step S290 where control returns back to step S130.

If the truncation points are not to be changed, control continues to step S300 where control continues back to step S130 if the quantization tables are to be adjusted, otherwise the control sequence ends.

Figure 4:
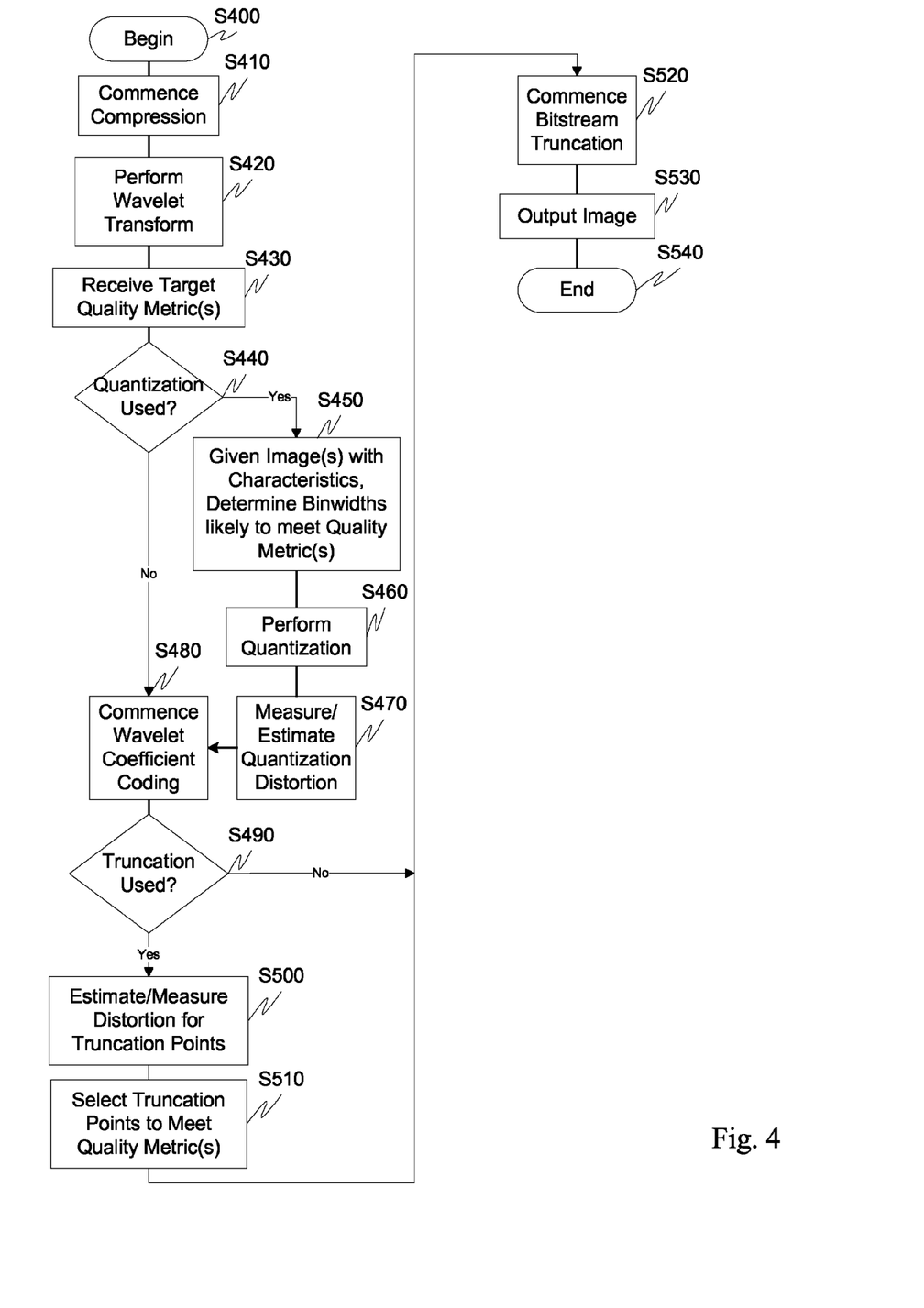
FIG. 4 is a flowchart illustrating a third exemplary compression method according to this invention.

FIG. 4 outlines a third exemplary embodiment of image quality control where, for example, a user specifies a target quality metric(s) prior to quantization and truncation. In particular, control begins as step S400 and continues to step S410. In step S410, compression commences. Then, in step S420, the wavelet transform is performed. Then, in step S430, one or more target quality metrics are received. For example, as previously discussed, the quality metrics can be directly input by, for example, a user, or, for example, based on the one or more received image types. The quality metric(s) can be, for example, a target compression rate, a target file size, a target quality and/or a layer target quality. Control then continues to step S440. In step S440, a determination is made whether quantization is used. If quantization is used, control continues to step S450. Otherwise, control jumps to step S480.

In step S450, and given an image(s) with certain characteristics, the binwidths likely to meet the received target quality metric(s) are determined Next, in step S460, quantization is performed. Then, in step S470, a measurement and/or estimate of the quantization distortion is obtained. Control then continues to step S480.

In step S480, wavelet coefficient coding commences. Next, in step S490, a determination is made whether truncation is used. If truncation is not used, control jumps to step S520. Otherwise, control continues to step S500.

In step S500, one or more of an estimate or measurement of the distortion of the truncation points is determined Next, in step S510, truncation points are selected to meet the one or more quality metrics. Then, in step S520, bitstream truncation commences. Control then continues to step S530.

In step S530, the compressed image is output. Control then continues to step S540 where the control sequence ends.

As an illustrative example, using lossy compression techniques with, for example, medical images, requires strict controls to maintain image quality. A commonly used practice is to select a target compression ratio or a target file size that has been predetermined to provide a particular diagnostic quality. The compression ratio is chosen through empirical methods and is dependent on the type of image: typical dynamic range, image resolution, bit depth, etc. This process usually results in the selection of an appropriate compression ratio for each modality or type of images. The compression goals can be further modified to reflect how the images will be used (fast browsing, reference viewing or diagnostic reading), who the user is (radiologist, referring physician, insurance company), and system limitations such as available bandwidth. The selected target compression ratio or target file size is thus a reflection of the desired quality, not a direct measure of image quality. Using the exemplary techniques of this invention, it is possible to directly specify the target image quality.

For example, one of the most common quantitative measures used is of a class of criteria often called the "mean square criterion." In many image coding applications, the mean square error is often expressed in terms of a peak signal-to-noise ratio, pSNR.

While there are many image quality models, an exemplary technique implements a pSNR measurement. This pSNR measurement can be calculated as follows:

$$-20 * \log_{10}\left[\sum^{N} \frac{(x-x^1)^2}{N*\text{Range}}\right]$$

Where x is the original pixel value, $x^1$ is the decompressed pixel value, N is the number of pixels, and Range is the range of the pixel data of the original image, i.e., max(x)–min(x).

Figure 5:
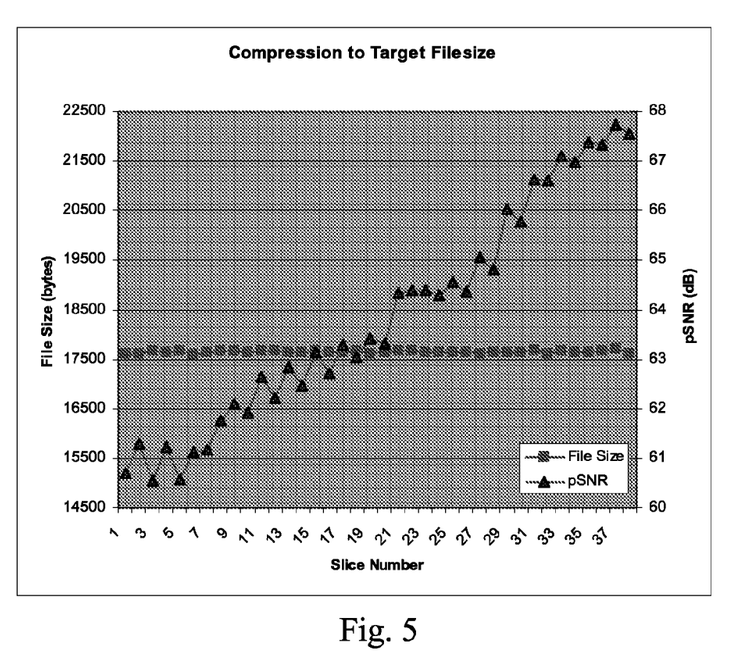
FIGS. 5-7 are plots illustrating the performance of the exemplary techniques according to this invention.

A target pSNR value can be specified for the overall image or for each quality layer of a JPEG2000 encoded image. This can be used with the progressive display capabilities of JPEG2000 to set minimum image quality values for each layer that is transmitted and displayed. FIG. 5 illustrates a chart of file size vs. pSNR for a series of 38 CT images from one study. All of the images were compressed using the above techniques and a target compression ratio of 30:1. The original images have a dimension of 512×512 pixels and a bit depth of 16 bits per pixel. While the images were all compressed to the same target file size, it can be seen that the resulting pSNR varies from image to image.

Figure 6:
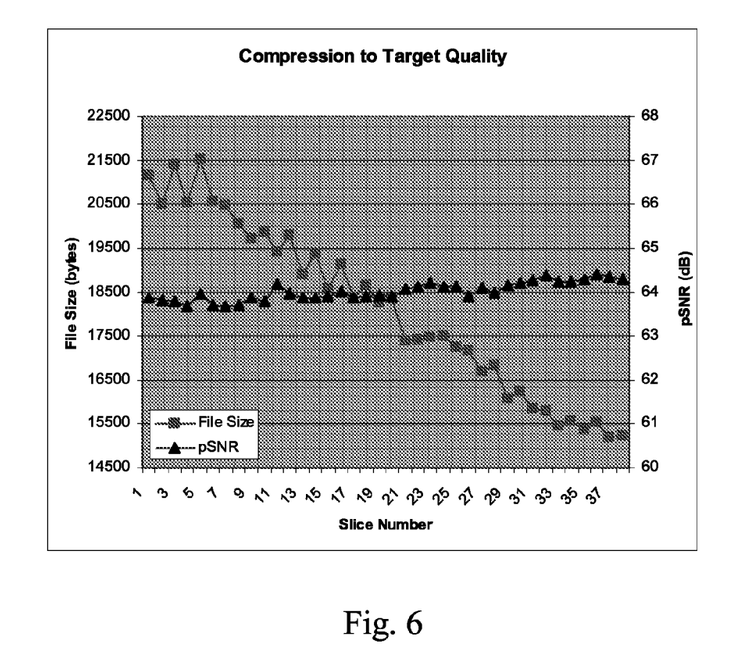

FIG. 6 illustrates the same series of images compressed to a target pSNR of 64 dB. The resulting compressed images were within a 0.3 dB range around the specified target pSNR while the resulting file sizes varied +20% to –20% around the mean file size.

Figure 7:
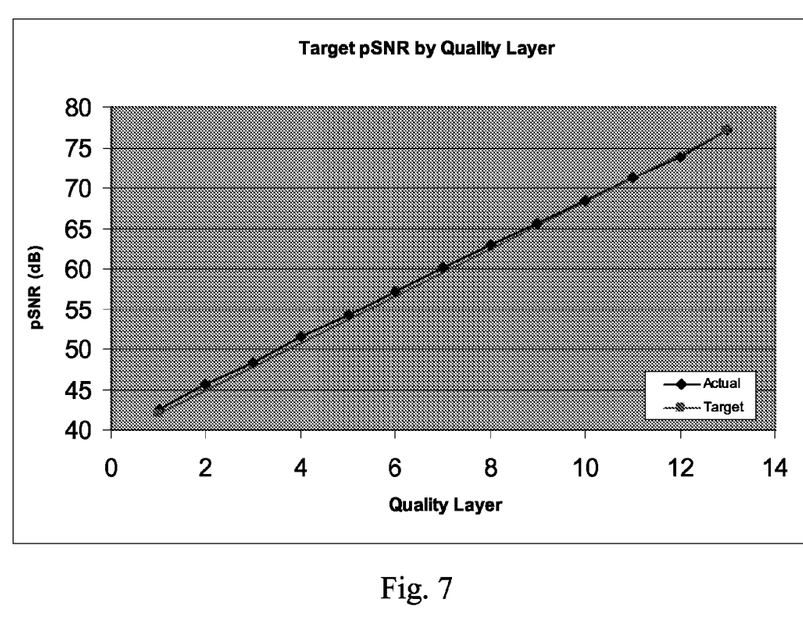

It is also possible to specify a target pSNR for each quality layer within the JPEG2000 file. FIG. 7 illustrates a plot of the actual pSNR and the target pSNR for a JPEG2000 file with 10 quality layers.

The above-described systems and methods can be implemented on an image processing device, an encoding/decoding device, or the like, or on a separate programmed general purpose computer having image processing capabilities. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and data encoding/decoding arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, as a plug-in, or the like. The system, methodology and protocols can also be implemented by physically incorporating the system and method into a software and/or hardware system, such as the hardware and software systems of an image processor.

It is, therefore, apparent that there has been provided, in accordance with the present invention, systems and methods for controlling image quality. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method to control a quality of image information comprising:
   receiving one or more of an image, a sequence of images and a layer of an image;
   receiving an indication of a desired image quality for a reconstructed version of a compressed version of the one or more of the image, the sequence of images and the layer of the image;
   commencing compression of the one or more of the image, the sequence of images and the layer of the image including performing a wavelet transform and wavelet coefficient coding;
   estimating, using one or more of Laplacian, generalized Gaussian, statistical and empirical modeling, distortion caused by one or more of quantization distortion and truncation distortion, wherein the estimating of distortion is performed without measuring the distortion;
   estimating, using one or more modeling techniques, a quality of the reconstructed version of the one or more of the image, the sequence of images and the layer of the image based on the estimated distortion;

automatically comparing, by a processor, the estimated quality to the desired image quality; and outputting the compressed version of the one or more of the image, the sequence of images and the layer of an image that meets the desired image quality.

2. The method of claim 1, wherein the compressed version is output when the estimated distortion corresponds to the desired image quality.

3. The method of claim 1, further comprising updating one or more of quantization tables and truncation points, wherein the updating step iteratively occurs until the estimated distortion corresponds to the desired image quality.

4. The method of claim 1, further comprising outputting a quality metric of the one or more of the image, the sequence of images and the layer of the image.

5. The method of claim 1, further comprising outputting one or more of an original version, an iterative version and the compressed version of one or more of the image, the sequence of images and the layer of the image.

6. A system to control a quality of image information comprising:

an image receipt module that receives one or more of an image, a sequence of images and a layer of an image;

a user interface that receives an indication of a desired image quality for a reconstructed version of a compressed version of the one or more of the image, the sequence of images and the layer of the image;

a compression module that compresses of the one or more of the image, the sequence of images and the layer of the image including performing a wavelet transform and wavelet coefficient coding;

one or more estimator modules that estimate distortion caused by one or more of quantization distortion and truncation distortion, wherein the estimate of distortion is performed without measuring the distortion using one or more of Laplacian, generalized Gaussian, statistical and empirical modeling, and estimate, using one or more modeling techniques, a quality of the reconstructed version of the one or more of the image, the sequence of images and the layer of the image based on the estimated distortion;

a processor that automatically compares the estimated quality to the desired image quality; and an image output module that outputs the compressed version of the one or more of the image, the sequence of images and the layer of an image that meets the desired image quality.

7. The system of claim 6, wherein the compressed version is output when the estimated distortion corresponds to the desired image quality.

8. The system of claim 6, wherein the image output module further updates one or more of quantization tables and truncation points, wherein the updating iteratively occurs until the estimated distortion corresponds to the desired image quality.

9. The system of claim 6, wherein a quality metric of the one or more of the image, the sequence of images and the layer of the image is output.

10. The system of claim 5, wherein the image output module further outputs one or more of an original version, an iterative version and the compressed version of one or more of the image, the sequence of images and the layer of the image.

11. A system to control a quality of image information comprising:

means for receiving one or more of an image, a sequence of images and a layer of an image;

means for receiving an indication of a desired image quality for a reconstructed version of a compressed version of the one or more of the image, the sequence of images and the layer of the image;

means for commencing compression of the one or more of the image, the sequence of images and the layer of the image including performing a wavelet transform and wavelet coefficient coding;

means for estimating distortion, using one or more of Laplacian, generalized Gaussian, statistical and empirical modeling, caused by one or more of quantization distortion and truncation distortion, wherein the estimating of distortion is performed without measuring the distortion;

means for estimating, using one or more modeling techniques, a quality of the reconstructed version of the one or more of the image, the sequence of images and the layer of the image based on the distortion estimation;

means for automatically comparing the estimated quality to the desired image quality; and means for outputting the compressed version of the one or more of the image, the sequence of images and the layer of an image that meets the desired image quality.

12. The system of claim 11, wherein the compressed version is output when the estimated distortion corresponds to the desired image quality.

13. The system of claim 11, wherein the means for outputting further or updates one or more of quantization tables and truncation points, wherein the updating iteratively occurs until the estimated distortion corresponds to the desired image quality.

14. The system of claim 11, further comprising means for outputting a quality metric of the one or more of the image, the sequence of images and the layer of the image.

15. The system of claim 11, further comprising means for outputting one or more of an original version, an iterative version and the compressed version of one or more of the image, the sequence of images and the layer of the image.

16. A non-transitory computer readable information storage media including instructions, that when executed by at least one processor or CPU, cause to be performed the steps of:

receiving one or more of an image, a sequence of images and a layer of an image;

receiving an indication of a desired image quality for a reconstructed version of a compressed version of the one or more of the image, the sequence of images and the layer of the image;

commencing compression of the one or more of the image, the sequence of images and the layer of the image including performing a wavelet transform and wavelet coefficient coding;

estimating distortion, using one or more of Laplacian, generalized Gaussian, statistical and empirical modeling, caused by one or more of quantization distortion and truncation distortion, wherein the estimating of distortion is performed without measuring the distortion;

estimating, using one or more modeling techniques, a quality of the reconstructed version of the one or more of the image, the sequence of images and the layer of the image based on the estimated distortion;

automatically comparing the estimated quality to the desired image quality; and outputting the compressed version of the one or more of the image, the sequence of images and the layer of an image that meets the desired image quality or updating one or more of quantization tables and truncation points if the desired image quality is not met.

* * * * *